United States Patent [19]
Ohta et al.

[11] 4,034,994
[45] July 12, 1977

[54] TUBULAR END STRUCTURE OF PIPE

[75] Inventors: Ryozo Ohta; Jyunji Kashihara; Masayuki Sakaguchi; Toshio Nakamoto; Ikuo Yamamoto; Michio Shibata, all of Sakai, Japan

[73] Assignee: Kubota Engineering Co, Ltd., Osaka, Japan

[21] Appl. No.: 655,625

[22] Filed: Feb. 5, 1976

Related U.S. Application Data

[63] Continuation of Ser. No. 466,597, May 3, 1974, abandoned.

[30] Foreign Application Priority Data

| May 7, 1973 | Japan | 48-50962 |
| Nov. 2, 1973 | Japan | 48-123565 |
| Nov. 2, 1973 | Japan | 48-123566 |
| Nov. 2, 1973 | Japan | 48-123567 |
| Dec. 5, 1973 | Japan | 48-136517 |

[51] Int. Cl.² .................................. F16J 15/10
[52] U.S. Cl. ......................... 277/207 A; 138/109; 285/345; 285/379
[58] Field of Search .......... 138/108, 109; 285/230, 285/231, 345, 379, DIG. 11; 277/207 A

[56] References Cited

U.S. PATENT DOCUMENTS

| 2,225,472 | 12/1940 | Franklin | 173/322 |
| 2,445,963 | 7/1948 | Montgomery | 285/230 |
| 2,722,438 | 11/1955 | Kennison | 285/163 |
| 2,953,398 | 9/1960 | Haugen et al. | 285/110 |
| 2,991,092 | 7/1961 | MacKay | 285/110 |
| 3,347,293 | 10/1967 | Clark | 145/50 |
| 3,460,427 | 8/1969 | Baumgarten | 85/8.8 |
| 3,520,541 | 7/1970 | Rohani | 285/379 X |

Primary Examiner—Richard E. Aegerter
Assistant Examiner—James E. Bryant, III
Attorney, Agent, or Firm—Frank J. Jordan

[57] ABSTRACT

A pipe joint in which an inner pipe is telescoped in an outer pipe includes a first and second expanded portion on the outer pipe. A packing member is disposed in the annular space between the second expanded portion and the inner pipe and a ring element is disposed in aligned annular grooves in the inner circumferential wall of the second expanded portion and the packing member. The ring element has a radial thickness equal to approximately one-half the difference between the inner diameters of the first and second expanded portions and serves to divide the packing member into two rim parts such that the latter are acted upon independently as the inner pipe is telescopically inserted into the outer pipe with the ring element preventing the rim parts from being axially displaced as the inner pipe is telescopically inserted in the outer pipe.

2 Claims, 20 Drawing Figures

TUBULAR END STRUCTURE OF PIPE

This is a continuation of application Ser. No. 466,597, filed May 3, 1974, now abandoned.

The tubular end structure of pipe into which spiling pipe is inserted so as to be held which must enable not only linear connection but also bent connection. An additional requirement is a peripheral structure for stably holding the packing essentially used in order to prevent leakage of the substance being carried through the connection.

At the time of connection the packing is likely to be dislocated from its regular position and moved to an irregular position because of its insufficient resistance against the pressing force of the pipe or the frictional force with the spiling pipe.

The instability of the packing is generally manifested by its movement from a regular position to an irregular position by rolling. When rolling has occurred, the connecting operation of the pipes must be repeated.

When the pipe into which spiling pipe is to be inserted has a structure having a diameter further enlarged than that of the main part of pipe, it is important to as much as possible avoid a strength-lowering tendency caused by centralization of a stress which is often encountered when a component where the strength is partially lowered is included or to avoid a tendency of being easily deformed caused by reduction of form-holding ability as much as possible.

In addition particularly in the case when a part with extended diameter is formed on the tubular end structure for connection wherein synthetic resin pipe is finally engaged in molding, the part with extended diameter is usually thinned by 10 to 20%, so that it must be noted to prevent reduction of the strength or the hardness caused by the aforesaid reason as much as possible. And also in the case when a tubular end structure for connection is formed through injection molding of synthetic resin, it should be considered to make a plan of forming a structure with an excellent strength.

In FIGS. 1 to 4 tubular end structures which are at present still connected employable with effectiveness are illustrated, those exhibit the structures which have been tried from the viewpoint of preventing packing from being unstably rolled in which it is obvious that the peripheral structure of setting the packing is an important factor of deciding the tubular end structure.

Figure 1A:
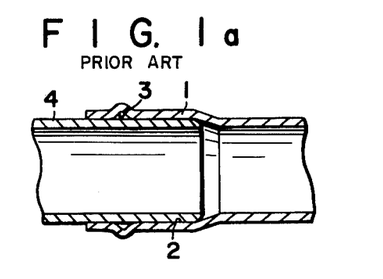

FIG. 1a exhibits an example of a ring channel through which a packing member is filled on the exterior of external wall surface 2 of tubular end part 1 enlarged with its diameter than that of main body of pipe 1'.

As the technique of forming this ring channel there is known Rehau-Plasticks' German Pat. No. 1,257,413.

The amount of the internally protrusion of the packing member from ring channel 3 has a serious influence on stability and preciseness on the connection of pipes so that as a matter of fact in the tubular end structure provided by Rehau Co., Ltd. the packing member is almost thoroughly filled in ring channel 3 and a slight amount of the packing member is controlled so as to be projected out of internal wall surface 2 toward the axial center. As aforestated by employing a slight part of the bore part of the packing member the packing member is totally compressed with the accompaniment of a necessary sealing effect.

As the result a strict permissible error has been provided with the dimension difference between the outer diameter of pipe 4 to be inserted and the bore of ring channel and with the allowable tolerance of ring channel which satisfies the remarkable restrictions of this condition ± 0.7 mm for 200 mm φ pipe, ± 0.9 mm for 300 mm φ pipe and ± 1.1 mm for 400 mm φ pipe have been employed.

Figure 1B:
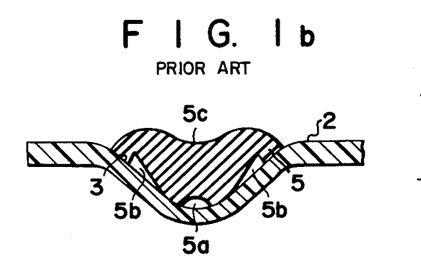

On ring channel 3 of tubular end 1 which has been formed standing on the presumption that the cost of pipe will be high, significantly specific packing 5 as shown in FIG. 1b by sectional view is specially applied. There is a characteristic with outer diameter part of packing 5 that on which particular convex surface 5a which has been specifically planned and 5b on the right and left is formed, and simultaneously on its bore part gentle indentation surface 5c is formed. When the above packing member is replaced by a packing member with unparticular indentations which resembles the above packing member, preciseness of the regular function of the packing is hardly expected because of the reasons that insertion of pipe 4 may become difficult or the sealing effect may become insufficient or rolling of the packing member, of which must be taken care may occur and a normal fitting condition may not be expected. Consequently even standing on the presumption that expensive pipes with a high accuracy will be used, the fact that practical utilization of it is difficult unless the quantity of compression deformation of packing member together employed is controlled to be small and it is molded in specific form makes it obvious that many problems to be technically solved are included.

Figure 1C:
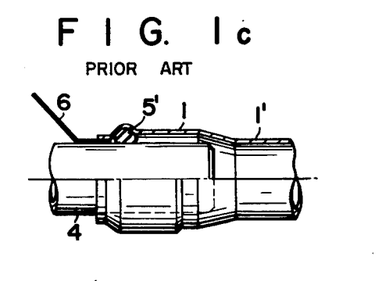

The structure shown in FIG. 1c exhibits an example when the main body of the pipe and the pipe to be inserted are connected so as to take a broken line with their axial centers (in the figure expressed by linear connection) wherein an angle of 3° to 4° is added. The stability of packing member 5' is not good so that at least one examination by check gauge 6 must be conducted after termination of the connection operation. As can easily be understood from FIG. 1a the structure shown in FIG. 1a is limited in the case when two pipes are linearly connected so as to take a straight line with their axial centers.

Figure 2:
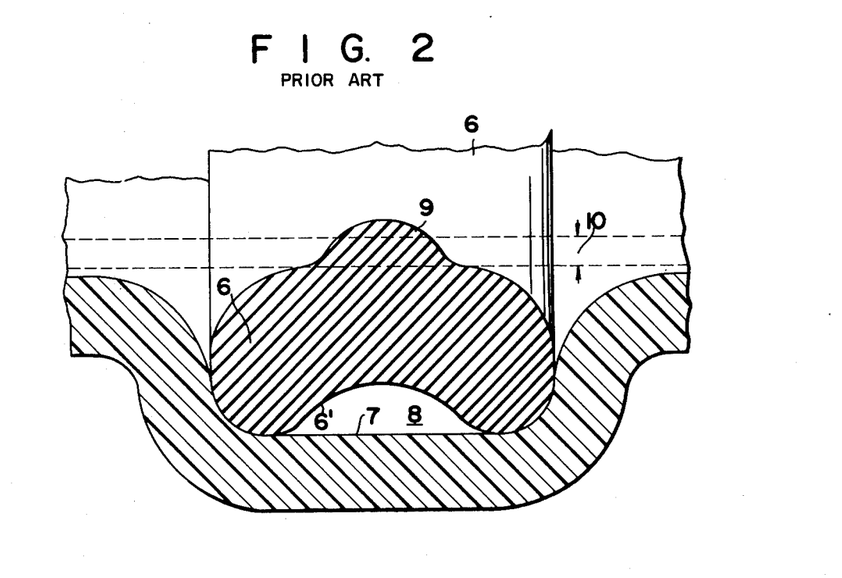

The tubular end structure according to FIG. 2 is disclosed in German Patent Application No. K56785 by Anger Co., Ltd. (Japanese Patent Publication No. 25746/1970) and utilizes the equal pressure action by an air cushion effect through formation of an air space 8 between the side surface of outer diameter 6' of elastic ring 6 and ring channel 7. However as shown in FIG. 2 the functional part of displaying a sealing effect against the pipe inserted is limited to protruding part 9 in the form of a sectional semicircle protruded part extending from the peripheral surface of the bore of elastic ring 6 and the ratio of the volume occupied by the functional part on the whole of the ring is very small.

The quantity of the protruded part 9 in providing a sealing effect is required to be fairly larger than the tolerance zone of standard diameter 10 (the range of tolerant error). And it seems that this technique is likely declined too much toward mitigation of spiling resistance of the pipe which is the object and the practical utilization of elastic ring 6 on the sealing effect is too small. The effect that protrusive part 9 of having a small rate of which it occupies as a volume depresses and deforms the whole of elastic ring 6 with the acceptance of an insertion pressure of the spiling pipe is small. Even if the side surface of the bore of the ring were contacted to the external wall of pipe spile the contact pressure would be slight. And it is difficult to certainly maintain the sealing function required against external pressures such as pressure of a matter to be carried and pressure loaded on the connected part.

Figure 3:
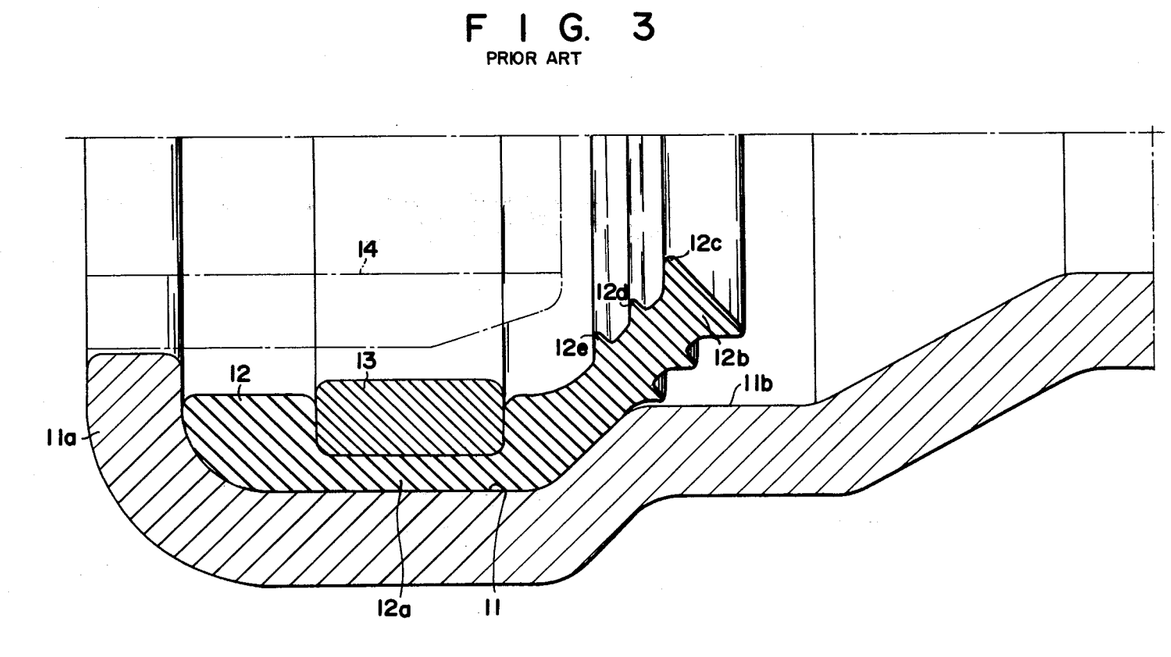

As above described other than the method of filling most the packing member in the ring channel there are conventional examples as shown in FIGS. 3 and 4 wherein tubular end structures employed when the packing is mechanically controlled by other members in order to make the fitting of packing material and its function stable are stated.

According to the tubular end structure disclosed in FIG. 3 of German Pat. No. 1,250,214 to Polva-Nederland N.V. fitting part 12a close to tubular end of packing member 12 is filled in ring channel 11 as well as in the above and to this fitting part 12a clamping ring 13 with an extending power to be externally added is applied from internal peripheral surface and pressed into ring channel 11 to be stabilized.

Sealing functioning part 12b which is protrudes in the ring-shaped form in the direction opposite to the tubular end from ring channel 11 is that to which inside and outside lips 12c, 12d and 12e are fitted.

As a means of preventing pipe inserted 14 from contacting with clamping ring 13 tubular end lip 11a is directly constructed by elongating the channel wall on the side of the tubular end lip of ring channel 11 toward the axial center so as to permit the aforesaid sealing functioning part 12b to be located between pipe 14 which is guided and inserted by the tubular end lip 11a and the surface of the internal wall of tubular end 11b.

From the basic viewpoint that it is intended to accomplish tight connection of pipes with a connection length as shorter as possible attention is paid on the point that the aforesaid ring channel and packing member occupied in the ring channel are not related to connection or connecting ability at all but simply form a dead space. However the packing member contributing to sealing effect is only of sealing functioning part 12b, the connecting ability which will be purposely understood is only of friction due to aforesaid sealing functioning part and further fitting part 12a of the packing matter filled in ring channel 11 slightly contributes to promotion of stability of the function of the aforesaid sealing functioning part 12b.

It is due to the reason that sealing functioning part 12b is compressed and the bend between the surface of internal wall of tubular end 11b and the external peripheral wall of pipe inserted 14 loses an elastic continuity against fitting part 12a.

A further point to be noted is that the use of lots of lips is essential on sealing functioning part 12b despite the stability of packing member 12 when connected has been intended to be improved. And it is understood that on the presumption that because as a sealing material to the connecting tubular end sufficient resistance and sealing ability are not expected the use of lip which has seldom used becomes unavoidable and according to the means of pressing the packing member by clamping 13 it is difficult to stably hold the packing member in general form capable of displaying sealing ability and resistance enough to be inevitably accompanied with larger frictional force to pipe inserted in comparison with the lip. Another example in FIG. 4 is of the tubular end structure which is disclosed in Japanese Patent Publication No. 16588/1961 filed by United States Pipe and Foundry Company. It is explained therein that said structure of which an object is to restrain the movement of packing member 15 in ring channel 16 wherein the packing member is held is characterized by a means to provide a indentation and a convex surface to be able to be reciprocally united between the outer diameter rim of packing member 15 and the bottom wall of the ring channel or a means to apply an adhesive between them. And particularly in the case of restraining the movement of the packing member by virtue of the unity of said convex surface and indentation the part to be so united of the packing member used comprises hard part 15b which is hardly deformed and the internal part in the direction to its axle comprises flexible part 15c which is easily deformed. That is to say, the employment of packing members which have different hardness and their structures are explained therein.

Figure 4A:
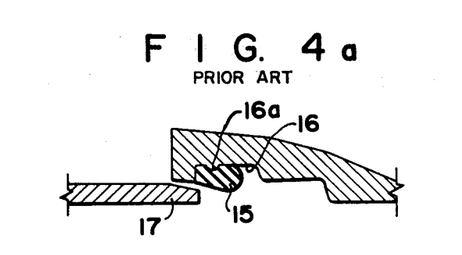

FIG. 4a represents the state prior to insertion of spiling pipe 17 when indentation channel 15a corresponding to annular projection 16a is provided for the packing material in which the annular projection is provided with the bottom wall of ring channel 16.

Figure 4B:
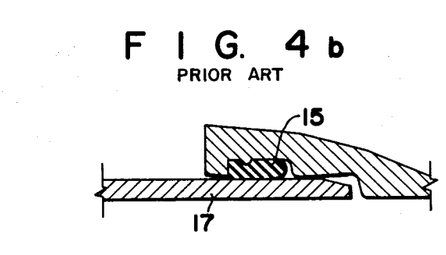
Figure 4C:
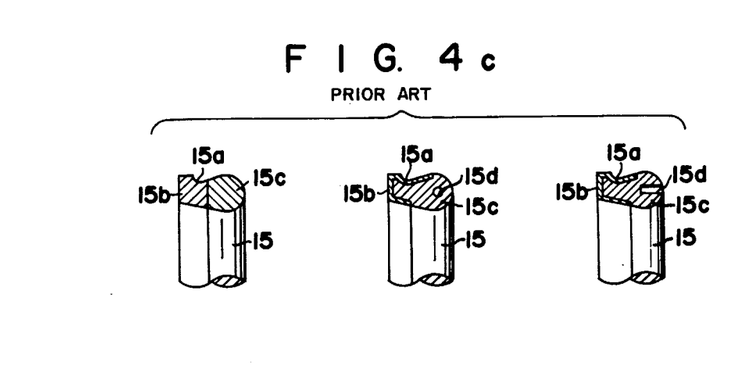

FIG. 4b represents the state when spiling pipe 17 has been connected. And FIG. 4c represents the internal structure of packing member 15. Hard part to be hardly deformed 15b is placed with an extension to around the middle of indentation channel 15a to be united with annular projection 16a and of the part near the tubular end lip of the bore rim effecting a sealing action and other flexible part to be easily deformed 15c is constituted in unity with aforesaid hard part. Hole or hole channel 15d is of a space which is formed in order to further soften flexible part 1c. In addition, from the structural form of which the annular indentation channel is used on ring channel 16 and annular projection is used on said hard part of the packing member, to the structural form of which an adhesive is used without employing the engagement function as in the former, the main aim is that a particular packing member of holding flexible part 15c which has been thickened and of preventing it from being rolled is used to obtain a sealing action due to the slight deformable property so as to permit hard part 15b which has been thinned in the radiant direction with the thickness to specify the position to be deformed of flexible part 15c wherein the spiling pipe is slightly contacted depending upon the particular structural form of the packing member so that the tubular end structure is still necessary to be further technically improved. Those pipes with accompaniment of the above tubular end structure are commercially available under the trade mark of "Tighton" but in the case of cast iron pipe the accuracy of the bore dimension on the ring channel is hardly guaranteed so that it will be experienced that though the flexible part of the above particular packing member is rather enlarged in comparison with the depth of the ring channel rolling is likely to occur when the combination of the dimensions is not suitable.

The present invention has been created as the result of fundamental repursuit on the tubular end structure of pipe to which a process of manufacturing conventional pipe end is applicable wherein analysis of rolling phenomenon which occurs when in the tubular end structure the packing material connects the spiling pipe and groping of conditions for the display of a further excellent function have been conducted. And the present invention relates to a tubular end structure and a method of manufacturing thereof wherein a principle for the prevention of rolling when the packing member is connected which has never been utilized for various tubular end structures is compatible with the improvement of sealing function after connection.

FIGS. 1 to 4c represent cross-sectional views of conventional tubular end structure, its main part or main part of packing member.

It is of course that the present invention is not limited to these and many variations realizable on the basis of the technical concept of the present invention are employable as the tubular end structure or the process for the manufacture thereof according to the present invention.

The basic principle of the present invention that has been successful in both prevention of the packing member from rolling when connected and accompaniment of an excellent sealing function after connection is different from the principle of FIGS. 1b and 2 in which relatively small compression deformation is conducted against the filled packing member in specific shape in the ring channel, from the principle of FIG. 3 in which the packing member is filled in the ring channel of the tubular end part by externally extending additional force and simultaneously a sealing effect is obtained by bending the sealing effecting part which is protrusive from ring channel in an opening between the external wall of the spiling pipe and the internal wall of the tubular end part, or from the principle of preventing flexible main part which is deformable through compression from rolling according to FIG. 4 in which the convex surface and the indentation are formed against opposed surface of hardly deformable hard part which is uniformly fixed to said flexible main part of the packing member and the internal wall of the tubular end part and mechanically controlling power on the basis of these hard convex surface and indentation is utilized or controlling force through an adhesive applied on said opposed surfaces of these convex surface and indentation is utilized, and the inventive principle comprises externally controlling tensile elongation deformation of general packing on the basis of friction at the middle part of both rims i.e. the deformation movement in a definite direction from the lip of the tubular end part toward the internal part of the tubular end part not to be generated so as to permit general packing having a flexible deformability to derive reciprocal compression between side rim part of the sylindrical packing which is connected to the spiling pipe and the internal rim part placed on the opposite side and further controlling radiantly directional power coming from the pipe inserted to the side rim part near the tubular end lip and formed-compressed volume due to the tensile power generated at the middle part not to pass through aforesaid externally controlled part.

As to unstability or rolling phenomenon when the packing member is connected, they mean phenomena that the packing member is at first distorted because of occurance of slip in a place of indefinite part with the external peripheral wall of the spiling pipe or the internal peripheral wall of the tubular end part and occasionally twisting is occured due to the reason that the reciprocal compression state of the packing material tensed by virtue of unexpectably great friction power between the packing member and the spiling pipe which occurs between the rim part near the tubular end lip and the internal rim placed oppositely to it is not always uniform at each circular level of the packing member (not only the quality of the packing member results in the factor but also the difference of shape and size of peripheral structure to be connected to this and of the state of surfaces to be connected is included as the factor). However a specific point is that it is understood to include a phenomenon that aforesaid rim part near the tubular end lip generating a great friction power is considered to compress the internal rim part on the opposite side, compressively deform the internal rim part of the latter externally in radiant direction and get over it.

An important matter which has been inductively derived from experiments on many experimental objects varied in shape is to control the packing member itself not to generate indefinite compressive deformation because of occurrence of reciprocal compression between aforesaid rim part near the tubular end lip and the internal rim part on the opposite side i.e. at aforesaid middle part level of packing matter.

It is said that the reasons that the basic principle of the present invention has never been brought to light are as hereunder explained with following FIGS. 4, 3, 2 and 1b, that are; as to the tubular end structure of FIG. 4, following this understanding, said rim near the tubular end lip of the packing member is substantially not contacted with the spiling pipe, which is simultaneously formed by an undeformable hard part wherein only said internal rim part is of a flexible substance. As to the example of FIG. 3 only said internal rim part is utilized as the sealing part while a distance is kept between the rim part near the tubular end lip and the spiling pipe, as to the example of FIG. 2 a round protuberance is formed at the center of internal peripheral surface of the packing member so as to be a substantially narrow place with contacting the sealing part and in the case of FIG. 1b it is understood that technically troublesome and expensive tubular end structure is provided because of the employment of a particular means of controlling severely the extent of radiantly directional contact of the packing member in order to prevent friction power which brings about rolling.

The tubular end structure according to the present invention may be produced by virtue of conventional process for the production of a pipe tubular end, which is able to be applied on not only a long pipe with one-side acceptance part and one-side insertion part to which the use of packing is required, but also a flexible collar. The tubular end structure according to the present invention is useful on pipes to which the use of packing is essential such as synthetic resin pipes e.g. vinyl pipe, polyethylene pipe etc. which are presently much in request, PRP pipe and other bind pipes. As the packing member a lot of materials which are flexibly deformable in principle such as neoprene gum. SBR gum etc. which are frequently used in general may be employed wherein as to the type of them common ones are permitted.

The packing member self-tightening ring as hereunder explained in detail with its necessary functions is used with simplicity or plurality, and the choice is determined according to kind of a matter to be carried, pressure or sealing ability required together with the shape of ring of which the quality may be preferably of anti-corrosive metal such as stainless steel or of the same as the quality of pipe to constitute the tubular end structure.

In the case when the tubular end structure is constituted on synthetic resin pipes which are particularly noticeable with demand the quality of the pipes is eventually of thermoplastic synthetic resin which post-forming process is employed, and not only thermoplastic but also thermosetting synthetic resin pipes may be used when injection moulding process is employed.

As to the middle element which is required for the constitution of the tubular end structure according to the present invention not only deformable middle element but also common middle element with which a filler is used are hereunder explained. The deformable middle element means of forming extending diameter part which is necessary for the tubular end structure by expansion and condensation of lots of collapsible segments radiantly divided in radiant direction according to the necessity or of being able to be pulled out from tubular end.

Figure 5:
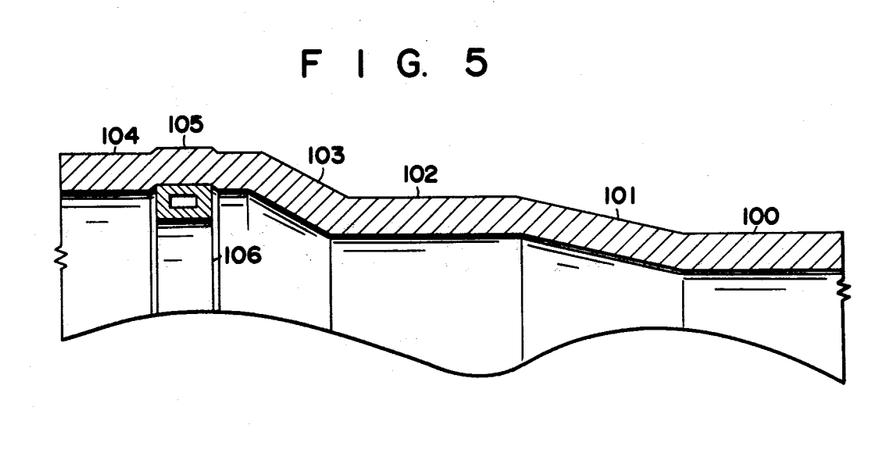
FIG. 5 represents a cross-sectional view of an example of the tubular end structure based on the present invention wherein the symmetrical upper half of the view is abbreviated.
Figure 6:
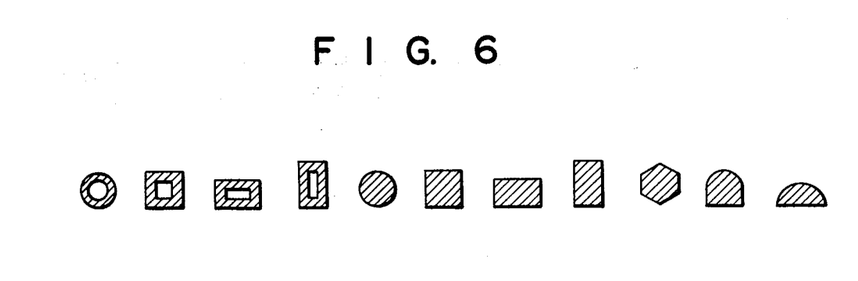
FIG. 6 represents cross-sectional views of practically utilizable various cross-sectional shapes of self-tightening ring of the packing member.

In the tubular end structure first expanded part 102 is formed through different level part in pyramidal form 103 continuous with pipe main body of pipe 100, further second expanded part 104 is formed through different level part in pyramidal form 103 continuous with said first expanded part 102 and packing material self-tightening ring 106 is annularly placed on the internal wall of said second expanded part. As said annular ring 106, as shown in FIG. 6 those having a cross-sectional form may be used and hollow annular rings are also employable.

The function which is required on said packing member self-tightening ring is as follows; necessary and undefectable function is that a great influence is not accepted on the cross-sectional form of ring and is chosen owing to sealing ability required only with consideration of the pressure of the matter to be carried.

Figure 7:
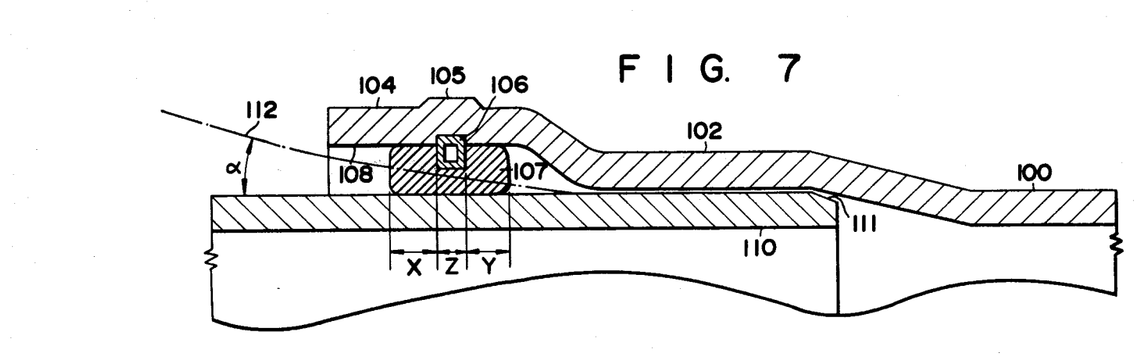
FIG. 7 represents a cross-sectional view of displaying partially abbreviated tubular end in connected state which is connectable in linear or broken-line-like state according to the present invention.

The main action of packing material self-tightening ring 106 which realizes the previously stated principle is to regularize occurence of internal stress at intermediate part Z between the rim part of on the tubular end lip side of packing member 107 and internal rim part Y on the opposite side in FIG. 7. That is to say, said intermediate part Z is externally controlled so that at the time of insertion of spiling pipe 110 (FIG. 7), an axial deformation movement or an axial tensile stress on the basis of the friction power with said spiling pipe will be generated.

The internal stress at intermediate part Z will be a compression stress in the radiant direction when tapered end 111 of spiling pipe 110 reaches said intermediate part, successively axial tensile stress is added while generating axial deformation movement with following the admission of tapered end 111, slippage once becomes occurred between said intermediate part Z and external peripheral wall of the spiling pipe after termination of the deformation movement thereafter mainly the axial tensile stress controls the stability of the movements of said intermediate part Z. If the stress state is constant and hardly changed no condition of generating a twist within the packing material is derived.

When an indented part corresponding to the above ring 106 is formed to packing member 107, intermediate part Z of which thickness is thinned by both rim parts X and Y will hardly generate a change on said internal stress state only with its thinned part. When compression stress in the radiant direction at said intermediate part Z is controlled to be greater than that of the rim part on tubular end side X in stead of thinning said intermediate part, thrust of said rim part X to said intermediate part Z may be controlled thereby to be able to prevent rolling. In every case of these the thing which finally becomes important is of height of packing material self-tightening ring 106, namely, the thickness of intermediate part Z held between spiling pipe and said ring is adjusted to be substantially thinner than that of both rim parts X and Y continued before and after it, and generation of an unspecified stress state is avoidable with influence of the internal stress generated at the rim part X on the tubular end lip side onto rim part Y on the opposite side. Accordingly the principle of the present invention can not be realized by the lower height in the prior art in which it is realizable by fixing the packing member to the lower height.

As being understood from aforesaid explanation on necessary functions which are displayed by said ring this height is not necessary to be uniformly determined. However as the standard of height about a half of the difference between the internal peripheral wall of second expanded part 104 which is formed for occupation of packing material 107 and the internal peripheral wall of first expanded part 102 which is formed for housing spiling pipe may be indicated. On common packing member its rolling or unstability may be solved by together use with ring having about a half of this height and the height of said ring may be varied according to the quality.

As above stated packing member self-tightening ring 106 may be self-tightened (meaning the state wherein the internal stress of the intermediate part is raised to be higher than those of the left and right side parts) particularly at intermediate part Z not to transmit the internal stress of the rim part on the tubular end lip side X of packing member 107 combined with said packing member self-tightening ring to internal rim part Y on the opposite side. And after connection of spiling pipe 110 it is possible that axial tensile stress generated at intermediate part Z is changed into a self-tightening power which permits both rim parts X and Y to reciprocally draw and an excellent sealing ability is displayed onto spiling pipe 110.

In FIG. 7 of indicating a connection state the state wherein lip of tubular end part makes opening 108 is shown a linear connection wherein the axial center of spiling pipe 110 and the axial center of tubular end part are linearized is conductable, furthermore as shown by one-point chain line 112 other connection wherein the axial center of spiling pipe is bent so as to form an angle of $\alpha$ with the axial center of the tubular end part is possibly performed. Said angle of $\alpha$ may be about 3° to 4°.

Since the sealing ability of intermediate part Z which is held by packing member self-tightening ring 106 is great, the sealing ability is still maintained even if spiling pipe 110 is engaged in eccentricity by an angle of $\alpha$. And spiling pipe 110 which is housed in first expanded part 102 is prevented from being deformed in flatness. Further through opening 108 the fixing state of packing member 107 can be observed and even in the case of expecting its certainty confirmation is easily conductable without using check gauge.

Figure 8:
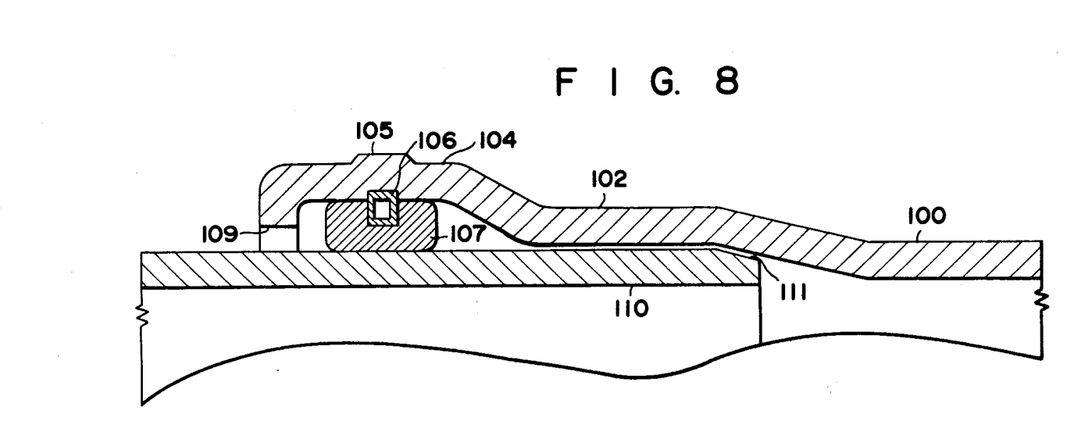
FIG. 8 represents partially abbreviated cross-sectional view of the tubular end structure when only linear connection is employed according to the present invention.

In FIG. 8 the tubular end structure in which sealing lip 109 comprising the tightened tubular lip of second expanded part 104 is formed is shown and is employed when it is necessary to prevent packing member 107 from the projection particularly because of high pressure of the matter to be carried. Only linear connection is possible because of having blocking lip 109.

From the reason of constituting packing material self-tightening ring 106 with having the important functions as above described on the tubular end part a proper process is next explained.

Figure 9A:
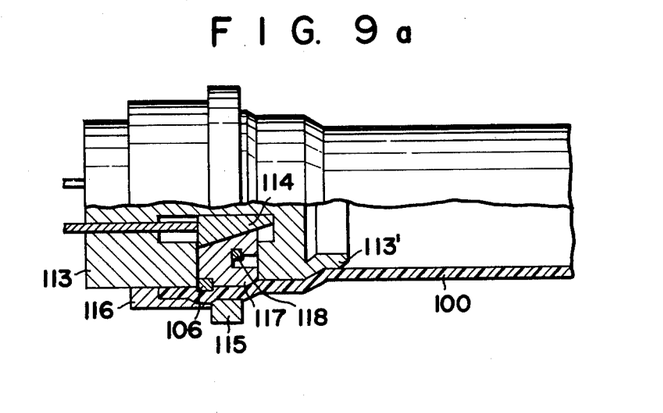
FIG. 9a represents a side elevation according to partial cross-sectional view of displaying the tubular end structure together with middle element properly deformable for the manufacture of the tubular end structure in the present invention.

With deformable middle element 113 thrust taper ring 114 with having axial advance and retreat movements is provided to be matched to the axial center, which holds collapsible material 117. Molding dies 116 and 115 are together used for molding the external peripheral wall of the tubular end part. First expanded die 113' forms first expanded part 102 and by virtue of thrust taper ring 114 collapsible material 117 expanded from the state in FIG. 9c to the state in FIG. 9d forms second expanded part 104. In FIG. 9a packing material self-tightening ring 106 is held by dent channel 117a which is placed to the left side of collapsible material 117 and together with expansion of collapsible material 117 it is fixed on the internal peripheral wall of second expanded part 104.

Figure 9B:
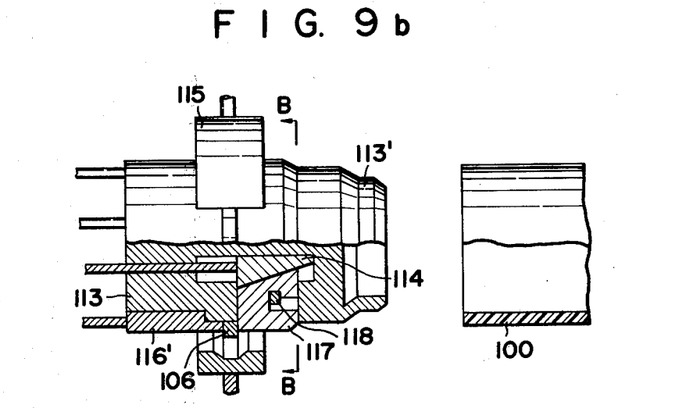
FIG. 9b represents a side elevation wherein other deformable middle element which is exhibited by a partial cross-sectional view.

In FIG. 9b ring 106 is held to middle element 113 and thrust ring 116' is sent toward the right direction to expanded and deformed collapsible material 117 in the figure thereby to press said ring 106. Ring 106 not regulated in precise ring-shaped is corrected by this. Molding die 115 is preferably of cut into 2 to 4 however ring 106 is fixed on the internal peripheral wall of expanded part 104 by pressure from the external direction of second expanded part 104. As collapsible part 117 is condensed to first expanded die 113' the whole of deformable middle element 113 may be pulled out of the tubular end.

In case of the tubular end part with a small aperture since reduction tendency when cooled is utilized the fixing of ring 106 is conductable without employing said molding die.

Figure 9C:
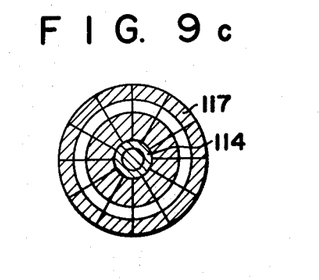
FIG. 9c represents a cross-sectional view along B—B line on FIG. 9b wherein a middle element in condensed state is shown.
Figure 9D:
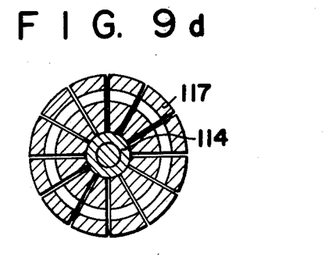
FIG. 9d represents a cross-sectional view of the middle element when elongated.

When reduction of collapsible material 117 is not smoothly generated simply by movement of thrust taper ring 114 toward the left direction on the figure as returned to the state of FIG. 9c after moving thrust taper ring 114 toward the right direction on the figure and expanding collapsible material 117 to the state of FIG. 9d to enlarge the external peripheral surface it is possible for collapsible material 117 to be always reduced with together provision of wheel-shaped ring 118.

Figure 10:
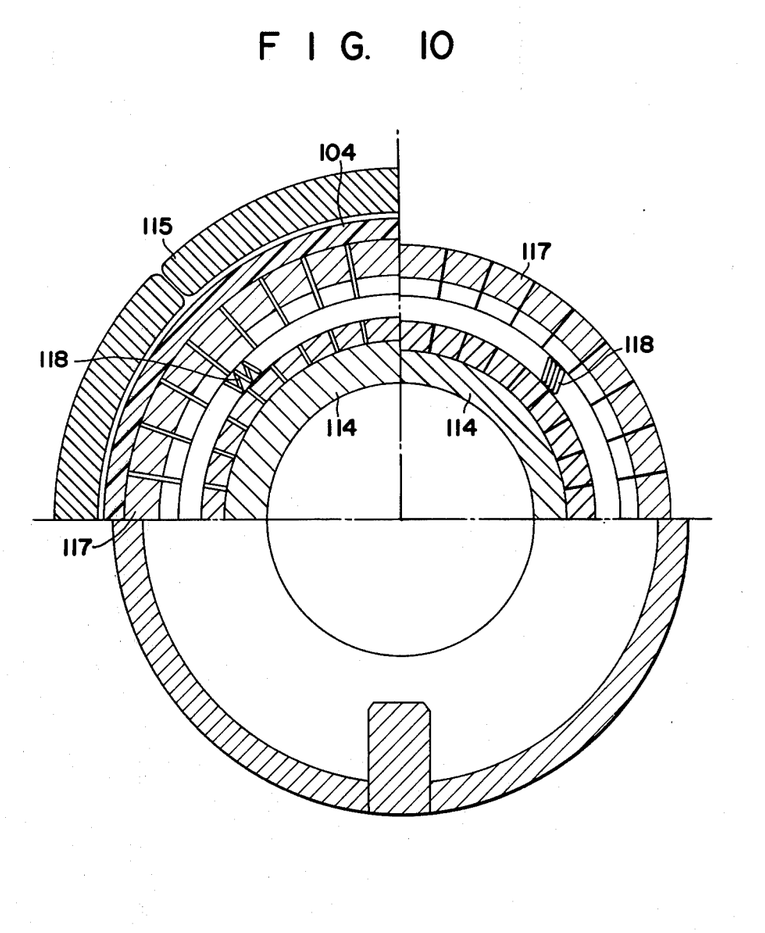
FIG. 10 represents a cross-sectional view along C—C line of the deformable middle element according to FIG. 11 when expanded and deformed.
Figure 11:
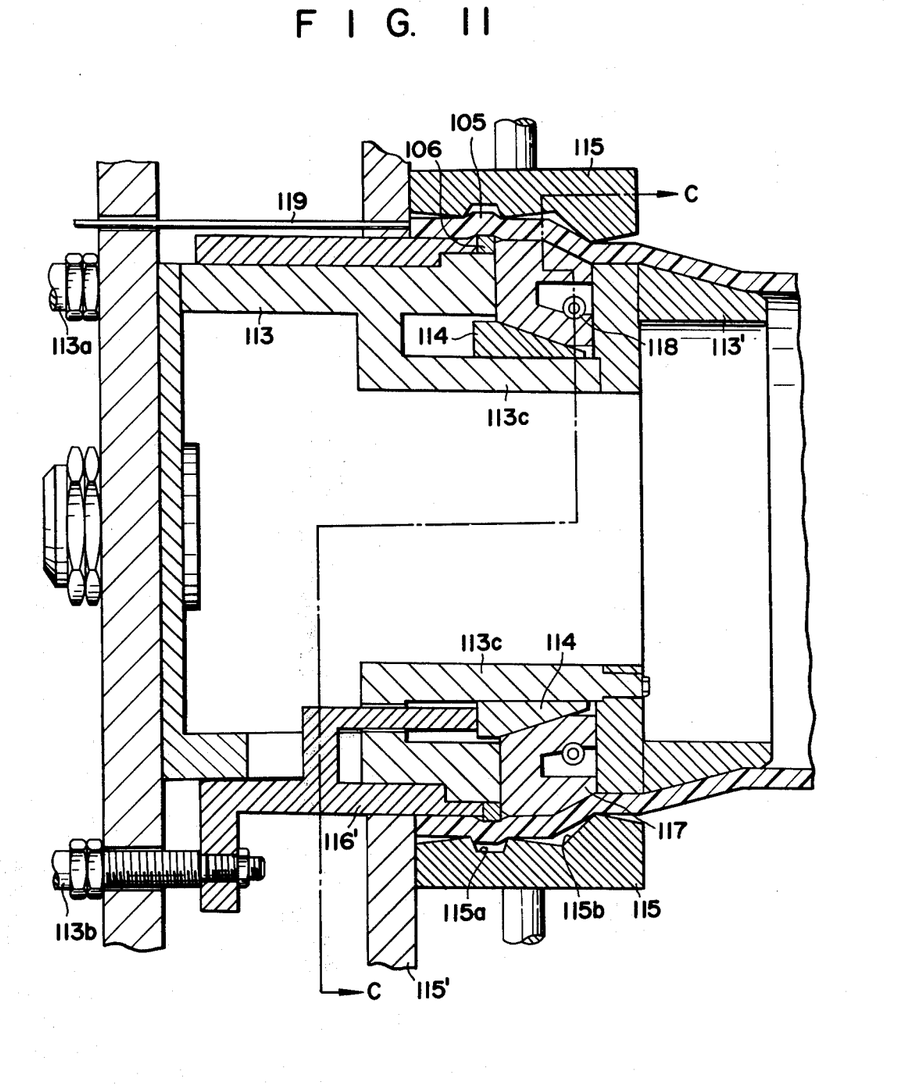
FIG. 11 represents a detailed cross-sectional view of deformable middle element wherein an example of surface molded in a external molding box is exhibited.

As to collapsible material 117 of deformable middle element 13 which is shown in FIG. 11 its cross-sectional view along C—C line on the figure is shown in FIG. 10.

The left upper section on FIG. 10 indicates the state when the radius of the circle formed by collapsible material 117 is expanded to hold second expanded part 104 of pipe 100 and the right upper section on the figure indicates the state when the radius of the circle formed by collapsible material 117 has been reduced.

Packing member self-tightening ring 106 is installed to supporting bases 113C, 113C constituted by two divided parts, which are moved toward axial direction by virtue of cylinders 113a and 113b.

Thrust taper ring 114 attached to thrust ring 116' may be uniformly moved advancely and retreatly toward the axial direction with the operation of cylinder 113a and b. When thrust taper ring 114 is moved toward the right direction on the figure thrust ring 116' which is moved simultaneously as collapsible material is expanded when thrust taper ring 114 is moved toward the right direction on the figure presses said installed ring 106 onto the back of collapsible material 117 under engagement in expansion and deformation to correct its annular form to be precisely held.

When aforesaid deformed middle element is introduced to the tubular end part which has been thermosetted first expanded part 102, second expanded part 104 and small protuberance 105 are respectively formed to the internal peripheral surface of the small protuberance 105 packing member self-tightening ring 106 is fixed.

The quantity of middle element 113 to be inserted is determined to prescribed quantity with together use of percepter 119.

Dividing die for molding 115 which externally pressed is guided by plate 115' has a molding surface of particularly compressing the bottom part of said small protuberance 105 and the bent part of the first expanded part as shown in the figure and installation of a gentle cone surface but the cylindrical surface with the die permits somewhat movement of inside material of pipe thereby to able to prevent the thickness of the tubular end part from being thinned.

After completion of fixation of ring 106, when after waiting progression of cooling, cylinders 113a and 113b are operated to move thrust taper ring 114 and thrust ring 116' toward the left direction on the figure collapsible material 117 is reduced to decrease the radius to be inferior to the bore of ring 106 and deformable middle element 113 may be pulled out of the tubular end part.

Also in the case of constituting blocking lip 109 on the tubular end part the bore of blocking lip 109 is equal to or slightly superior to the bore of first expanded part 102 so that the middle element is not hindered with being pulled out.

Figure 12:
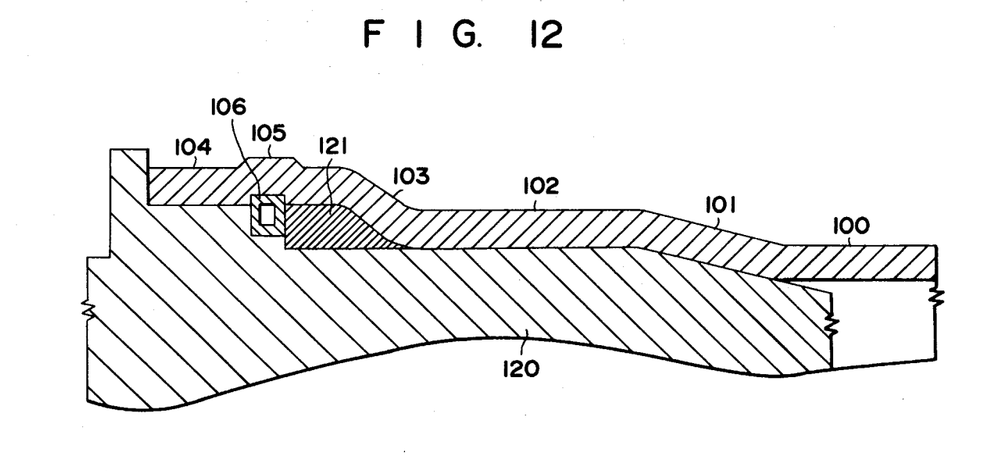
FIG. 12 represents partially abbreviated cross-sectional view of the other middle element when the tubular end structure in the present invention is constituted together with a cross-sectional view of the tubular end structure.

The middle element in FIG. 12 is an example of common middle elements which are not self-deformable wherein sleeve end pin 120, is that packing member self-tightening ring 106 and accepting lip molding ring 121 which is a pattern model of pyramidal level different part are combined so as to mold a tubular end structure.

The characteristic of this middle element which is understandable without any particular explanation is that aforesaid accepting lip molding ring 121 may consist of the packing member itself. When sleeve end pin is pulled out after molded and aforesaid accepting lip molding ring 121 is turned around and sat on ring 106 it is possible to be used as packing member 107 as explained in detail.

Figure 13:
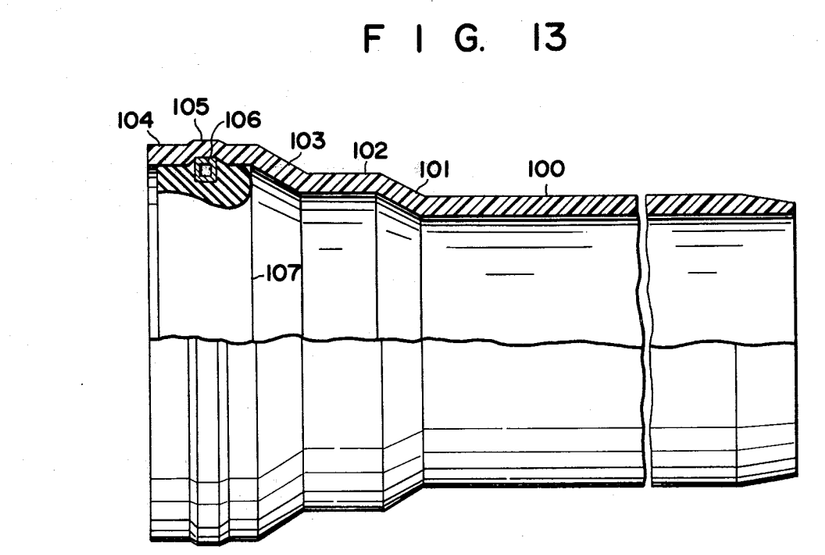
FIG. 13 represents a side elevation according to a partial cross-section wherein the tubular end structure in the present invention and packing members are exhibited.

FIG. 13 indicates a long pipe which constitutes an exemplified tubular end structure according to the present invention but the packing member shown in the figure may be widely employed over various fields. When the tubular end part is constituted with following postforming process corresponding part is connected to a middle element as shown in the above example after thermosetted and when pipes to be molded are of synthetic resin this postforming process may be applied as long as they are thermoplastic. As the tubular end part is constituted simultaneously when pipes are produced according to injection molding process an excellent tubular end structure on the basis of the present invention may be easily produced by combining die for pipes and middle element as above stated to constitute a cast cavity.

As aforestated stability of the packing member is maintained because intermediate part Z of packing material 107 which is self-tightened by the action of packing material self-tightening ring 106 is controlled with internal stress in constant state, compression stress generable at the rim part on tubular end lip side X is prevented from being transmitted to internal rim part Y on the opposite side and imparticular generation of internal stress of packing member 107 or disadvantageous change of the state of internal stress may be prevented. Thereby insertion pressure against pipe or the like required at the time of connection may be also reduced. The insertion pressure required in the case of the tubular end structure in FIG. 1b is 50 kg when 200 mm φ pipe is connected and about 100 kg when 500 mm φ pipe is connected and in each of them connection of pipe by hands is impossible. However when the tubular end structure on the basis of the present invention is employed with an insertion pressure of 20 kg for 200 mm φ pipe and of 40 kg for 500 mm φ sufficient connection of pipe is attainable. Said small insertion pressures in the latter case are of such numerical values that connection of pipe is conductable simply by hands without utilization mechanical power so that the improvement appeared with this point is practically noticeable. Needless to say, aforesaid packing material self-tightening ring which realizes the basis principle the present invention may remarkably stabilize the movement of the packing material when connected so that dimension accuracy required on the tubular end structure may be significantly lowered from high dimension accuracy which had to be strictly severe in prior art i.e. tubular end part accuracy on 200 mm φ pipe is ± 2.1 mm, that on 300 mm φ is ± 2.6 mm, that on 400 mm φ pipe is ±3.4 mm and that on 500 mm φ pipe is ± 3.9 mm. In comparison with known accuracy required it is said that the accuracy may be loosened by about 3 times. On this point a remarkable improvement may be recognized.

The anticipated effect may be obtained as long as cross-sectional shape of the packing member self-tightening ring takes as the main constituent of contour a member selected from rectangle, polygon, circle and semicircle and further the whole of the facing surface of said ring to the external peripheral surface of the spiling pipe is a plane or convex surface and it is at least not permitted that the surface is of dent as a whole. And in order to promptly realize connection operation when rim part on the tubular end lip side X is equal to or slightly superior to the outer diameter of spiling pipe (FIG. 13) the packing member may be widely applied over various filds without reduction of its sealing ability.

What is claimed is:

1. A synthetic resin pipe joint in which an inner synthetic resin pipe is telescoped in an outer synthetic resin pipe, said outer pipe having a longitudinal end section having a first expanded portion and a second expanded portion, said second expanded portion forming an opening end of said outer pipe, said second expanded portion having an inner diameter greater than the inner diameter of said first expanded portion, said inner pipe being telescopically disposed in said first and second expanded portions, said second expanded portion having an inner circumferential wall spaced from the outer wall of said inner pipe to define an annular space therebetween, a packing member disposed in said annular space, said packing member having axial ends, said inner circumferential wall of said second expanded portion extending beyond said axial ends of said packing member, said inner circumferential wall of said second expanded portion having an inner annular groove therein, said second expanded portion having an outer circumferential wall, an annular projecting section on said outer circumferential wall disposed generally radially outwardly of said inner annular groove, said packing member having an outer circumferential annular groove therein generally aligned with said inner annular groove in said inner circumferential wall of said second expanded portion, a metallic ring element disposed and fixed in said aligned grooves, said ring element having a radial thickness equal to approximately one-half the difference between the inner diameters of said second and first expanded portions, said packing member having an inner rim part disposed on one axial side of said ring element and an outer rim part disposed on the other axial side of said ring element, said rim parts contacting said inner circumferential wall of said second expanded portion and the outer wall of said inner pipe, said packing member having an intermediate part disposed between said ring element and said inner pipe and serving to separate said outer rim part from said inner rim part such that said outer and inner rim parts are acted upon independently as said inner pipe is telescopically inserted into said outer pipe, said ring element preventing said outer rim part from being axially displaced out of position as said outer rim part is engaged by said inner pipe during telescopic insertion of said inner pipe into said outer pipe.

2. A pipe joint according to claim 1 wherein said packing member engages said inner pipe along substantially the entire length of said packing member.

* * * * *